(12) United States Patent
Owaki et al.

(10) Patent No.: US 8,500,255 B2
(45) Date of Patent: Aug. 6, 2013

(54) MANUFACTURING METHOD OF LIQUID EJECTING HEAD, LIQUID EJECTING HEAD, AND LIQUID EJECTING APPARATUS

(75) Inventors: Hiroshige Owaki, Okaya (JP); Hiroyuki Kobayashi, Shiojiri (JP); Kazuhide Nakamura, Asahi-mura (JP)

(73) Assignee: Seiko Epson Corporation, Tokyo (JP)

( * ) Notice: Subject to any disclaimer, the term of this patent is extended or adjusted under 35 U.S.C. 154(b) by 491 days.

(21) Appl. No.: 12/712,010

(22) Filed: Feb. 24, 2010

(65) Prior Publication Data
US 2010/0214379 A1    Aug. 26, 2010

(30) Foreign Application Priority Data

Feb. 25, 2009    (JP) .................................. 2009-041919

(51) Int. Cl.
*B41J 2/175*    (2006.01)

(52) U.S. Cl.
USPC ........................................................... 347/85

(58) Field of Classification Search
USPC ............. 347/84, 85, 86, 92, 93, 25.35, 890.1, 347/311, 314, 316.01, 319
See application file for complete search history.

(56) References Cited

U.S. PATENT DOCUMENTS

| 2007/0139488 A1 | 6/2007 | Fujishiro |
| 2009/0122125 A1 | 5/2009 | Owaki et al. |
| 2009/0207222 A1 | 8/2009 | Kamikura |
| 2009/0225142 A1* | 9/2009 | Kamikura ....................... 347/92 |

FOREIGN PATENT DOCUMENTS

| JP | 06-183007 | 7/1994 |
| JP | 2000-211130 | 8/2000 |
| JP | 2005-144691 | 6/2005 |
| JP | 2007-015247 | 1/2007 |
| JP | 2007-144888 | 6/2007 |
| JP | 2009-113250 | 5/2009 |
| JP | 2009-132135 | 6/2009 |
| JP | 2009-190278 | 8/2009 |

* cited by examiner

*Primary Examiner* — Kristal Feggins
(74) *Attorney, Agent, or Firm* — Workman Nydegger

(57) ABSTRACT

A manufacturing method produces a liquid ejecting head including first and second flow path members having liquid flow paths that communicate with each other. An integrally-molded member is surrounds the second flow path member on the second flow path member side of the first flow path member to join the first and second flow path members together. A holding process defines a space portion for forming the integrally-molded member in a frame section. The frame section is brought into contact with a contact surface of a recessed portion in the face of the second flow path member opposite the first flow path member, with the first and second flow path members contacting each other such that the liquid flow paths communicate with each other. A molding process fills the space portion with resin, thereby molding the integrally-molded member, and joins the first and second flow path members together.

8 Claims, 13 Drawing Sheets

MANUFACTURING METHOD OF LIQUID EJECTING HEAD, LIQUID EJECTING HEAD, AND LIQUID EJECTING APPARATUS

BACKGROUND

1. Technical Field

The present invention relates to a manufacturing method of a liquid ejecting head which ejects liquid, a liquid ejecting head, and a liquid ejecting apparatus, and in particular, to a manufacturing method of an ink jet type recording head which ejects ink as liquid, a liquid ejecting head, and a liquid ejecting apparatus.

2. Related Art

In an ink jet type recording head which is a representative example of a liquid ejecting head, in general, ink is supplied from an ink cartridge, which is a liquid reservoir means filled with ink, to a head main body through ink flow paths formed in an ink supply needle constituting an ink supply body which is detachably inserted into the ink cartridge, and a flow path member such as a cartridge case in which the ink cartridges are held, and the ink supplied to the head main body is discharged out of a nozzle by driving a pressure generation means such as a piezoelectric element provided in the head main body.

In such an ink jet type recording head, if air bubbles, which are present in the ink of the ink cartridge, or air bubbles, which are mixed in the ink when mounting or detaching the ink cartridge, are supplied to the head main body, there is a problem that a discharge defect such as dot omission due to the air bubbles is generated. In order to solve such a problem, there is a recording head in which a filter for removing air bubbles, dust, or the like in the ink is provided between the ink supply needle, which is inserted into the ink cartridge, and the flow path member (for example, refers to JP-A-2000-211130).

Also, such a filter and the flow path member are fixed to each other by heat welding or the like, and the ink supply needle and the flow path member are fixed to each other by ultrasonic welding or the like.

However, if the ink supply needle and the flow path member are fixed by heat welding, there is a fear that a gap will be generated, and therefore there is a problem that ink leaks from the gap. Also, such a problem exists in not only the ink jet type recording head, but also a liquid ejecting head which ejects liquid other than ink.

SUMMARY

An advantage of some aspects of the invention is that it provides a manufacturing method of a liquid ejecting head, which can reduce the size of the head, and also reduce costs by reliably preventing the leakage of liquid, a liquid ejecting head, and a liquid ejecting apparatus.

According to a first aspect of the invention, there is provided a manufacturing method of a liquid ejecting head including a flow path member that has first and second flow path members having liquid flow paths provided to be communicated with each other, and an integrally-molded member which is provided at a region surrounding the second flow path member on the second flow path member side of the first flow path member so as to join the first flow path member and the second flow path member together, the method including: a holding process of defining a space portion for forming the integrally-molded member in a frame section and also bringing the frame section into contact with a contact surface of a recessed portion provided in the second flow path member on the face on the side opposite to the first flow path member, in a state where the first flow path member and the second flow path member are brought into contact with each other such that the liquid flow paths are communicated with each other; and a molding process of filling the space portion with resin, thereby molding the integrally-molded member, and also joining the first flow path member and the second flow path member together by using the integrally-molded member.

In this aspect, due to the integrally-molded member, a region for welding the second flow path member to the first flow path member is not needed, so that the head can be reduced in size. Further, due to the integrally-molded member, gaps are reliably prevented from occurring between the first flow path member and the second flow path member, so that liquid is reliably prevented from leaking from a gap. Further, since the frame section is brought into contact with the contact surface, the frame section can be subjected to pressure at the time of the molding of the integrally-molded member or shrinkage pressure at the time of cooling for curing, so that deformation of the second flow path member can be suppressed.

Here, it is preferable that the first flow path member and the second flow path member be molded by a molding frame section, a portion of the molding frame section be used as the frame section in the molding process, and the space portion be defined by retreating the region surrounding the second flow path member of the molding frame section with respect to another region. According to this, the molding of the first flow path member and the second flow path member and the molding of the integrally-molded member can be performed easily and at a low cost, and also the space portion in which the integrally-molded member is molded can be easily defined.

Further, it is preferable that the contact surface of the recessed portion of the second flow path member be flush with the end surface on the second flow path member side of the integrally-molded member. According to this, an area pressed by resin which forms the integrally-molded member can be suppressed to be as small as possible, so that the deformation of the second flow path member can be further reliably suppressed.

Further, it is preferable that the contact surface of the second flow path member be provided to be inclined at an obtuse angle with respect to the face of the first flow path member on which the second flow path member is provided. According to this, the contact surface can convert the direction of the pressure at the time of the molding of the integrally-molded member so that the second flow path member is pressed against the first flow path member side, and close contact of the first flow path member with the second flow path member is increased, whereby the intrusion of a resin material into the liquid flow paths can be reliably suppressed.

Further, it is preferable that the recessed portion be provided at a region where the first flow path member and the second flow path member come into contact with each other. According to this, even if the second flow path member is pressed at a relative great pressure against the first flow path member through the recessed portion, the deformation of the second flow path member can be suppressed, so that the intrusion of resin, which forms the integrally-molded member, into the liquid flow paths can be suppressed.

According to a second aspect of the invention, there is provided a manufacturing method of a liquid ejecting apparatus including: electrically connecting a control section, which controls the liquid ejecting head manufactured by the manufacturing method of a liquid ejecting head according to the first aspect, to the liquid ejecting head.

In this aspect, the liquid ejecting apparatus which can be reduced in size, and also improves print quality can be manufactured.

According to a third aspect of the invention, there is provided a liquid ejecting head including: a flow path member that has first and second flow path members having liquid flow paths provided to be communicated with each other, and an integrally-molded member which is provided a region surrounding the second flow path member on the second flow path member side of the first flow path member, and also joins the first flow path member and the second flow path member together, wherein in the second flow path member, further inside than the integrally-molded member, there is provided a recessed portion recessed in a direction, which intersects with the surface of the first flow path member, to which the second flow path member is joined.

In this aspect, since the first flow path member and the second flow path member are fixed and integrated by the integrally-molded member, a region for welding the second flow path member to the first flow path member is not needed, so that the head can be reduced in size. Further, due to the integrally-molded member, gaps are reliably prevented from occurring between the first flow path member and the second flow path member, so that liquid can be reliably prevented from leaking from a gap. Further, since the frame section is brought into contact with the contact surface, the frame section can be subjected to pressure at the time of the molding of the integrally-molded member or shrinkage pressure at the time of cooling for curing, so that deformation of the second flow path member can be suppressed. Further, since deformation of the second flow path member can be suppressed, excellent liquid supply performance can be obtained.

Also, according to a fourth aspect of the invention, there is provided a liquid ejecting apparatus provided with the liquid ejecting head according to the third aspect.

In this aspect, the liquid ejecting apparatus which improves print quality can be realized.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, the invention will be explained in detail on the basis of embodiments.

Embodiment 1

Figure 1:
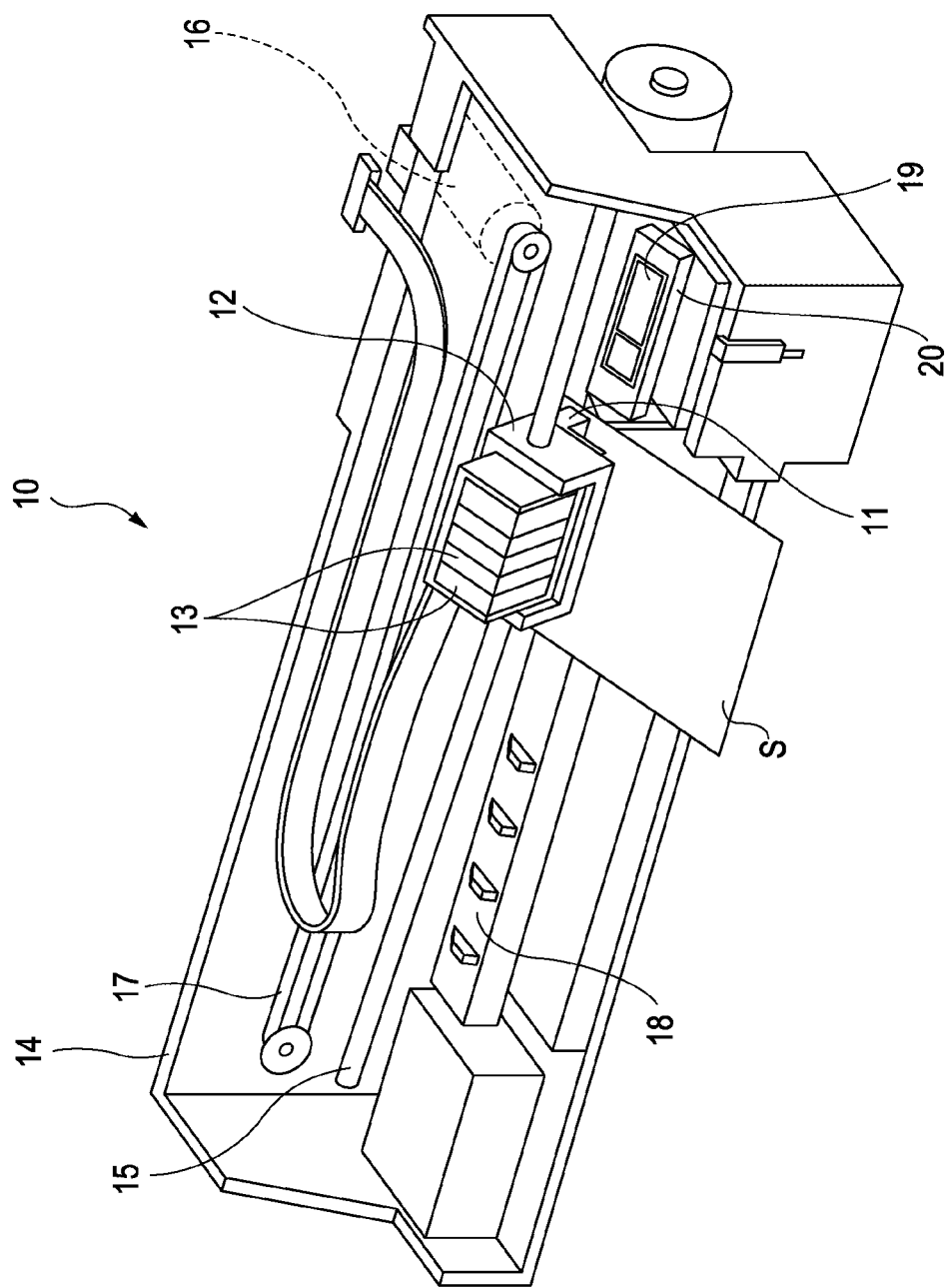
FIG. 1 is a schematic perspective view of a recording apparatus concerning Embodiment 1.

FIG. 1 is a schematic perspective view of an ink jet type recording apparatus which is one example of a liquid ejecting apparatus concerning Embodiment 1 of the invention. In the ink jet type recording apparatus 10 of the invention, as shown in FIG. 1, an ink jet type recording head (hereinafter also referred to as a recording head) 11 which is one example of a liquid ejecting head which discharges ink droplets is fixed to a carriage 12, and ink cartridges 13, which are liquid reservoir means, where ink of a plurality of different colors such as black (B), light black (LB), cyan (C), magenta (M), and yellow (Y) are stored, are detachably fixed to the recording head 11.

The carriage 12 on which the recording head 11 is mounted is provided to be movable in an axial direction on a carriage shaft 15 attached to an apparatus main body 14. Then, the carriage 12 is moved along the carriage shaft 15 by a driving force of a driving motor 16, which is transmitted to the carriage 12 through a plurality of gears (not shown) and a timing belt 17. On the other hand, in the apparatus main body 14, a platen 18 is provided along the carriage shaft 15, and a recording medium S, such as paper, fed by a paper feeding device (not shown) and the like is transported on the platen 18.

Also, at the position corresponding to the home position of the carriage 12, that is, in the proximity of one side end portion of the carriage shaft 15, there is provided a capping device 20 having a cap member 19 which seals the nozzle forming face of the recording head 11. By sealing the nozzle forming face, in which nozzle orifices are formed, by using the cap member 19, the drying of ink is prevented. Also, the cap member 19 also functions as an ink receiver during a flushing operation.

Figure 2:
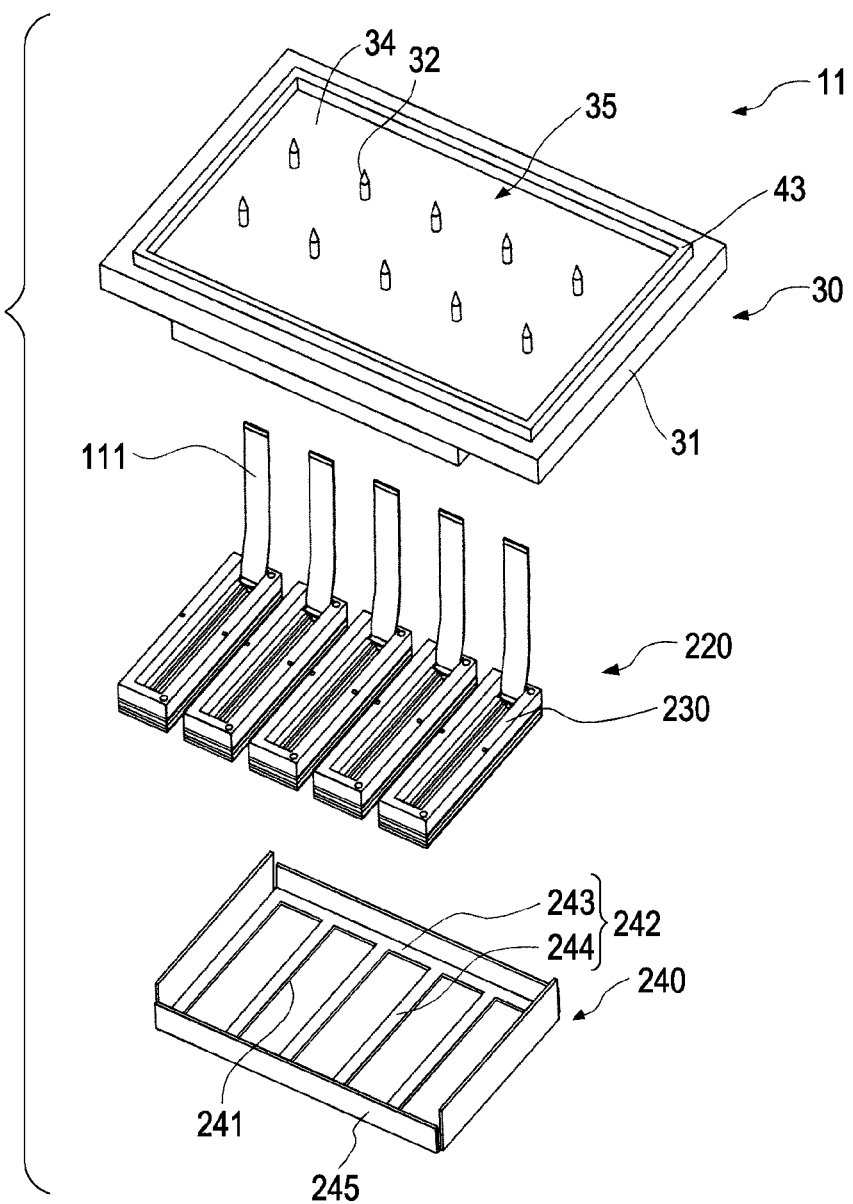
FIG. 2 is an exploded perspective view of a recording head concerning Embodiment 1.

Here, the recording head 11 concerning this embodiment is explained. FIG. 2 is an exploded perspective view of the ink jet type recording head which is one example of the liquid ejecting head concerning this embodiment.

As shown in FIG. 2, the recording head 11 includes a flow path member 30 such as a cartridge case in which the ink cartridges 13 that are ink reservoir means are fixed, a head main body 220 which is fixed to the face of the flow path member 30 on the side opposite to the ink cartridges 13, and a cover head 240 which is provided on the liquid ejecting face side of the head main body 220.

Figure 3:
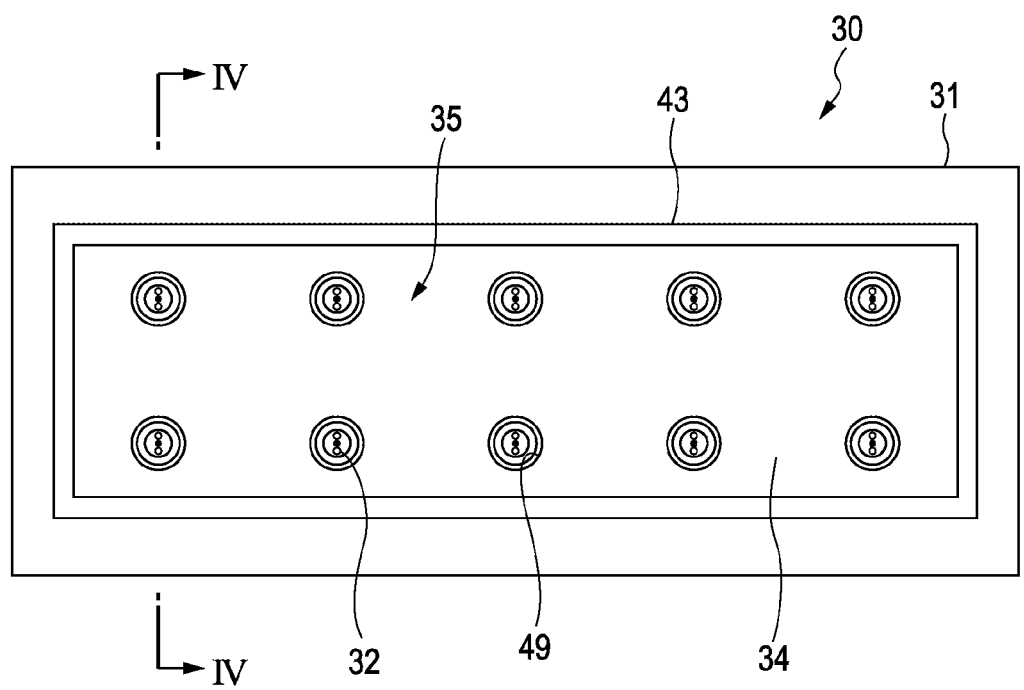
FIG. 3 is a top view of the recording head concerning Embodiment 1.

First, the flow path member 30 is explained in detail. FIG. 3 is a top view of the flow path member, and FIG. 4 is a cross-sectional view taken along line IV-IV of FIG. 3.

Figure 4:
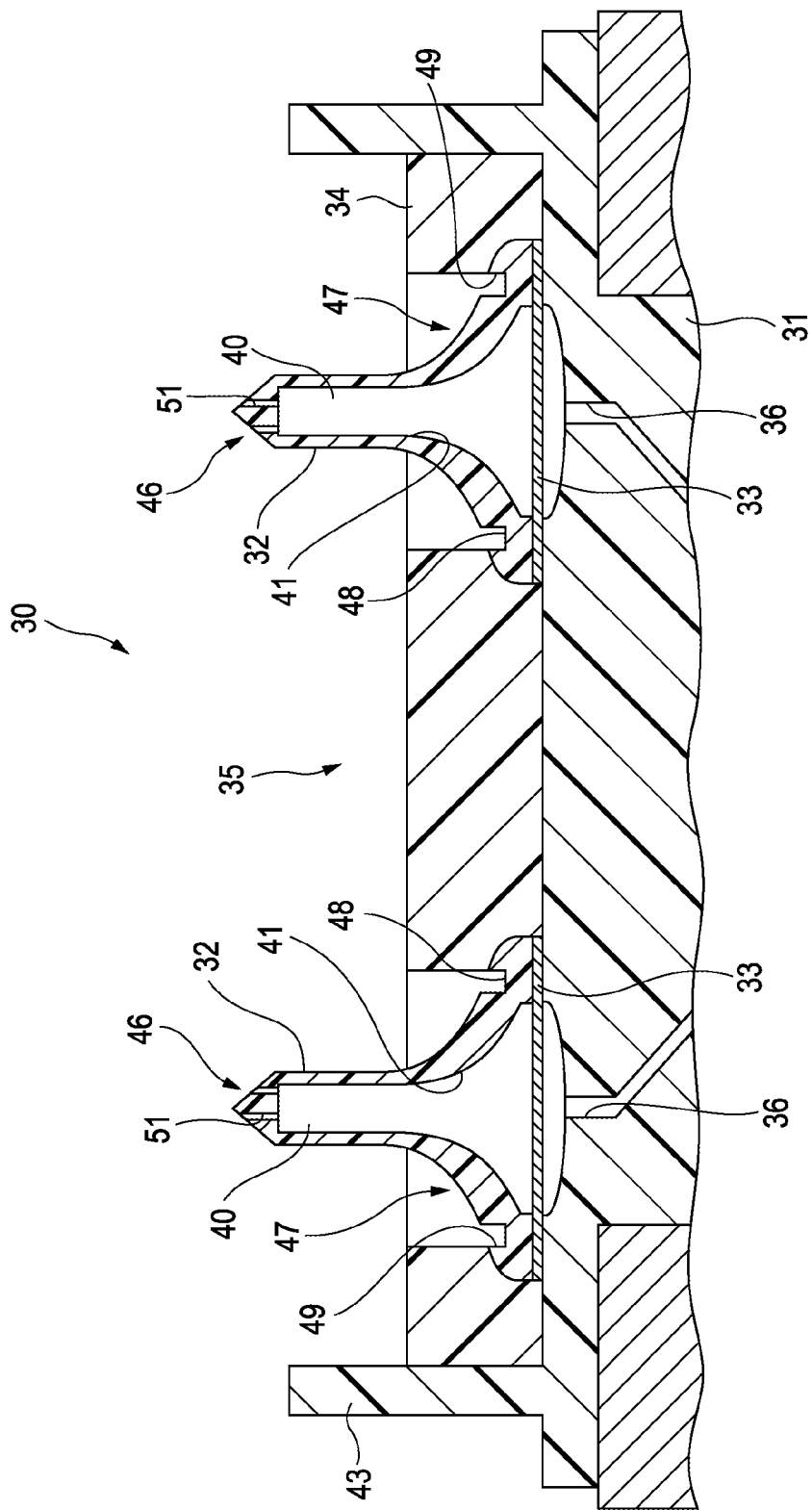
FIG. 4 is a cross-sectional view of the principal section of the recording head concerning Embodiment 1.

As shown in FIGS. 3 and 4, the flow path member 30 is provided with a flow path member main body 31 which is one example of a first flow path member, a supply needle 32 which is one example of a second flow path member and disposed on one side face of the flow path member main body 31, a filter 33 sandwiched between the flow path member main body 31 and the supply needle 32, and an integrally-molded member 34 which integrates the flow path member main body 31, the supply needle 32, and the filter 33.

The flow path member 30 has a supply body mounting portion 35 on one side face of which the above-mentioned ink cartridges 13 are mounted. Of course, the invention is not limited to an aspect in which the ink cartridges 13 are directly mounted on the supply body mounting portion 35, and an aspect is also acceptable in which ink is conducted through a tube or the like to the supply body mounting portion 35 from the ink reservoir means which stores ink.

In the flow path member main body 31, there is provided a main body side liquid flow path 36 which is positioned further on a downstream side than the filter 33 which will be described later, and opened at one end on the face (one side face of the flow path member main body 31) of the flow path member main body 31 on which the supply needle 32 is provided, and opened at the other end on the head main body 220 side, thereby supplying the ink from the ink cartridge 13 to the head main body 220. Also, although the details will be described later, a plurality of head main bodies 220, in this embodiment, five head main bodies 220, are provided in the flow path member 30, and two main body side liquid flow paths 36 are provided per one head main body 220. The ink from one ink cartridge 13 is separately introduced to each of the two main body side liquid flow paths 36.

Also, at the flow path member main body 31, a wall portion 43 is formed along a circumferential direction of one side face to which the supply needle 32 is fixed. Inside the wall portion 43, the integrally-molded member 34 which is formed in a manufacturing process which will be described later is provided such that a leading end portion 46 side of the supply needle 32 protrudes.

The supply needle 32 is fixed to one side face of the flow path member main body 31 and has a skirt portion 47 which becomes wider from the leading end portion 46 toward a bottom side. The supply needle 32 has a needle side liquid flow path 40 which is communicated with an ink inlet port 51 provided in the leading end portion 46, and the needle side liquid flow path 40 is communicated with the main body side liquid flow path 36 of the flow path member main body 31 through the filter 33. That is, in this embodiment, the main body side liquid flow path 36 of the flow path member main body 31 and the needle side liquid flow path 40 of the supply needle 32 constitute a liquid flow path of the flow path member.

In the needle side liquid flow path 40 provided in the supply needle 32, there is provided a filter chamber 41 which is a space having an inner diameter which becomes wider toward the main body side liquid flow path 36 side, that is, a widened portion. The ink supplied from the ink cartridge 13 is supplied to the main body side liquid flow path 36 through the opening on the filter 33 side of the filter chamber 41.

The filter 33 is sandwiched between the flow path member main body 31 and the supply needle 32 in a state where it is disposed to traverse the liquid flow path. As the filter 33, a sheet-like member having a plurality of pores formed by finely weaving fibers made of metal, resin, or the like, a plate-like member of metal, resin, or the like in which a plurality of pores are perforated, or the like, can be used. Further, as the filter 33, a nonwoven fabric or the like may also be used, and a material thereof is not particularly limited. Further, in this embodiment, a configuration is made such that the filter 33 which traverses the liquid flow path is provided between the flow path member main body 31 and the supply needle 32. However, along with the filter 33, or instead of the filter 33, various mechanisms such as a valve mechanism may also be provided. Of course, the filter 33 or the like may also not be provided.

By integral-molding joining, the integrally-molded member 34 joins the flow path member main body 31 and the supply needle 32 with the filter 33 sandwiched in therebetween. Here, the integral-molding joining means that the flow path member main body 31 and the supply needle 32 are joined to each other by molding the integrally-molded member 34 so as to come into contact with both the flow path member main body 31 and the supply needle 32. That is, although the details will be described later, the integrally-molded member 34 is a member molded with the surfaces of the flow path member main body 31 and the supply needle 32 as a mold. Further, by molding the integrally-molded member 34 with the surfaces of the flow path member main body 31 and the supply needle 32 as a mold, the flow path member main body 31 and the supply needle 32 are integrated (joined by integral-molding) in a state where they pinch the filter 33. Further, the boundary at which the flow path member main body 31 and the supply needle 32 come into contact with each other is covered by the integrally-molded member 34. Therefore, the leakage of ink from a gap between the flow path member main body 31 and the supply needle 32 can be suppressed.

Such an integrally-molded member 34 is provided over the circumferential direction of the supply needle 32 outside a pinch region. In this embodiment, the integrally-molded member 34 covers the end portion side of the skirt portion 47, and also, is provided over the entire of the inner side of the wall portion 43. The integrally-molded member 34 may also be provided in common to all supply needles 32 in this manner or formed for each supply needle 32.

On the other hand, in a case where the filter is welded to the flow path member main body by heat welding or the like, and further, the supply needle is welded by ultrasonic welding or the like, it is necessary to provide a region for welding the filter in the flow path member main body, and also provide a region for welding the supply needle outside the above-mentioned region. However, in the recording head 11 concerning the invention, since the flow path member main body 31 and the supply needle 32 are fixed by the integrally-molded member 34, the above-mentioned regions for welding are not needed. Therefore, it is possible to shorten the distance between adjacent supply needles 32, and thus reduce the size of the recording head 11. Further, since such a reduction in size is possible, it is not necessary to reduce the size of the head by making the area of the filter smaller. If the area of the filter is excessively small, dynamical pressure increases, so that a driving voltage which drives a pressure generation means such as a piezoelectric element or heater element must be increased. However, in the invention, since there is little necessity to reduce the size of the recording head by reducing the size of the filter, there is hardly any increase in dynamical pressure, and there is little necessity to raise the driving voltage.

Also, if the supply needle and the flow path member main body are fixed by welding, there is a fear that a gap will be generated, and ink may leak from the gap. However, in the invention, since the flow path member main body 31 and the supply needle 32 are fixed by the integrally-molded member 34, gaps are preventing from occurring between them, so that ink is prevented from leaking from a gap. Also, even if a gap did occur, the gap is covered by the integrally-molded member 34, so that the leakage of ink is prevented.

Further, since the integrally-molded member 34 is formed by molding, it is possible to use a material having low gas permeability (a material having a high gas barrier property). In this manner, by using a material having low gas permeability for the integrally-molded member 34, it is possible to reduce the leakage of gas in ink in the liquid flow path to the outside, and also the intrusion of gas from the outside into the liquid flow path. On the other hand, in adhesion or welding, in general, a material having high gas permeability is high in adhesion force or welding force, whereas a material having low gas permeability is low in adhesion force or welding force. Therefore, it is difficult to satisfy both the guarantee of joint strength (adhesion force or welding force) and the guarantee of gas barrier property. However, by using the integrally-molded member 34, it is possible to satisfy both the guarantee of joint strength and the guarantee of gas barrier property.

Also, in this embodiment, since the flow path member main body 31 and the supply needle 32 are joined by integral-molding by using the integrally-molded member 34, it is possible to use a material having low gas permeability (having high gas barrier property) for the flow path member main body 31 and the supply needle 32. Therefore, it is possible to suppress the leakage of gas in ink in the liquid flow path to the outside, and also the intrusion of gas from the outside into the liquid flow path.

Here, the supply needle 32 constituting the flow path member 30 of this embodiment has a recessed portion 48 provided further inside than the integrally-molded member 34. That is, the recessed portion 48 of the supply needle 32 is provided at a region which is not covered by the integrally-molded member 34. The recessed portion 48 has a contact surface 49, which intersects with the surface of the integrally-molded member 34, to which the supply needle 32 is adhered, and faces the side (in other words, the leading end portion 46 side or the center side) opposite to the integrally-molded member 34. In this embodiment, in the skirt portion 47 of the supply needle 32, the recessed portion 48 is provided which has a concave shape opened to the side opposite to the flow path member main body 31. Also, in this embodiment, the recessed portion 48 is provided to be continuous over the circumferential direction of the supply needle 32. In the recessed portion 48, its side surface on the integrally-molded member 34 side becomes the contact surface 49 which faces the side opposite to the integrally-molded member 34.

Further, the contact surface 49 of the recessed portion 48 is provided to be flush with the end surface on the supply needle 32 side of the integrally-molded member 34. This is due to the integrally-molded member 34 being molded in a state where a frame section is brought into contact with the contact surface 49 at the time of the molding of the integrally-molded member 34, although the details will be described later. Also, in this manner, by molding the integrally-molded member 34 so that the contact surface 49 of the recessed portion 48 is flush with the end surface on the supply needle 32 side of the integrally-molded member 34, that is, in a state where the frame section is brought into contact with the contact surface 49, the deforming of the supply needle 32 due to the pressure at the time of the molding of the integrally-molded member 34 can be suppressed.

Further, the recessed portion 48 is provided at a region where the flow path member main body 31 comes into contact with the supply needle 32, in this embodiment, within a pinch region where the filter 33 is pinched by the flow path member main body 31 and the supply needle 32. Here, having the recessed portion 48 provided at a region where the flow path member main body 31 comes into contact with the supply needle 32 means that, in a plan view of the surface of flow path member main body 31 on which the supply needle 32 is provided, the recessed portion 48 is provided to at least partially overlap with a region where the flow path member main body 31 comes into contact with the supply needle 32 (a region where the flow path member main body 31 and the supply needle 32 pinch the filter 33).

In this manner, by providing the recessed portion 48 at a region where the flow path member main body 31 comes into contact with the supply needle 32, when the supply needle 32 is pressed against the flow path member main body 31 side through the recessed portion 48 by the frame section at the time of the molding of the integrally-molded member 34, the deformation of the supply needle 32 is prevented, so that the supply needle 32 can be reliably pressed, although the details will be described later.

In this manner, since the deformation at the time of the manufacturing of the supply needle 32 of the flow path member 30 which is manufactured by a manufacturing method which will be described in detail later is suppressed, the occurrence of a defect such as the retention of air bubbles due to the deformation of the supply needle 32 is suppressed, so that the flow path member 30 having excellent liquid supply performance can be obtained. Accordingly, the ink jet type recording head 11 having excellent ink discharge characteristics can be obtained.

Figure 5:
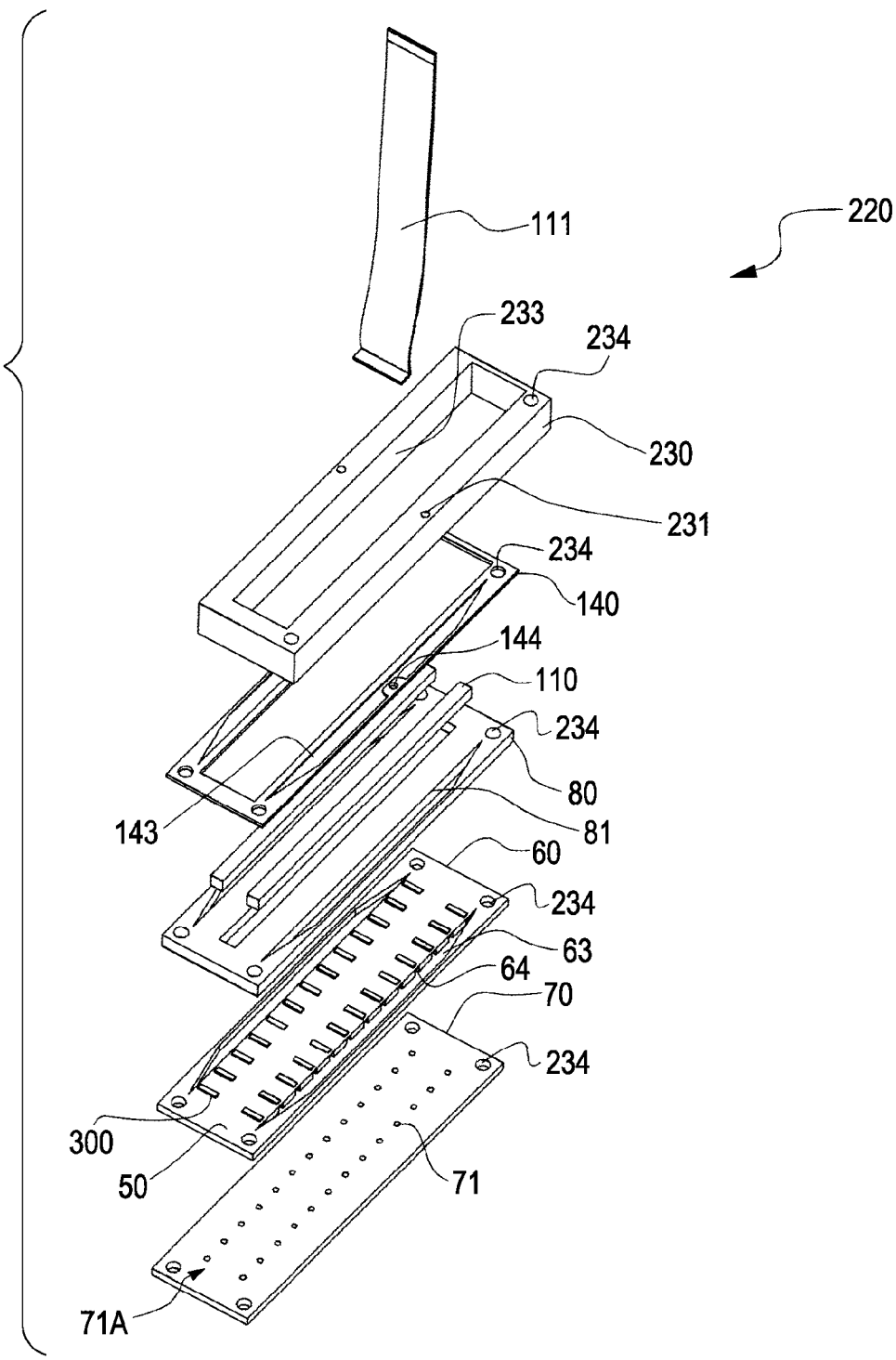
FIG. 5 is a perspective view of the principal section of the recording head concerning Embodiment 1.
Figure 6:
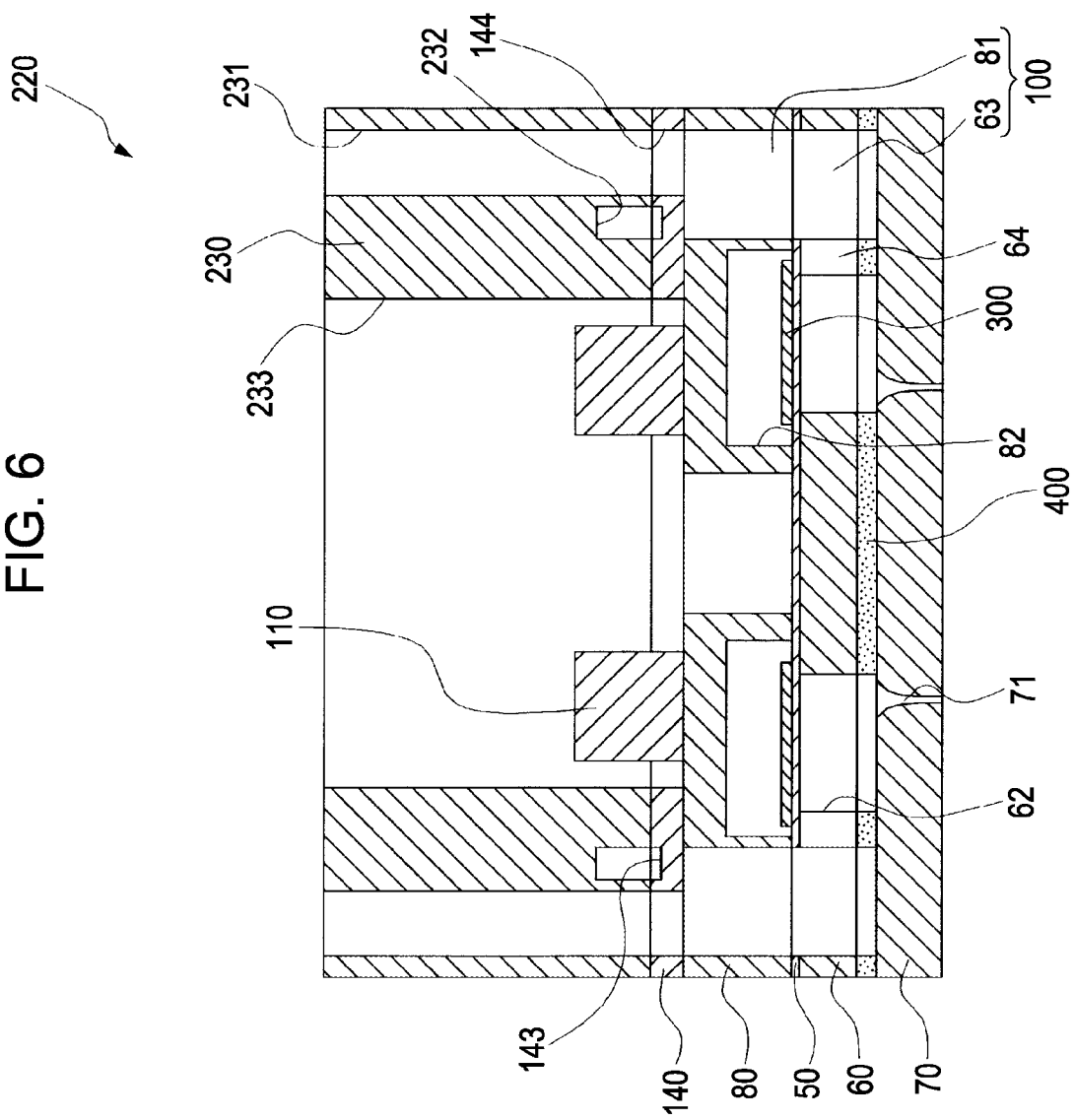
FIG. 6 is a cross-sectional view of the principal section of the recording head concerning Embodiment 1.

On the side opposite to the supply needle 32 of the flow path member 30, the head main body 220 is provided. Here, the head main body 220 is explained. In addition, FIG. 5 is an exploded perspective view of the head main body, and FIG. 6 is a cross-sectional view of the head main body.

As shown in the drawings, a flow path forming substrate 60 constituting the head main body 220 is made of, in this embodiment, a silicon single crystal substrate, and on one side surface thereof, an elastic film 50 made of silicon dioxide is formed. In the flow path forming substrate 60, by anisotrophic-etching it from the other side surface thereof, pressure generation chambers 62 partitioned by a plurality of partition walls are formed in two rows arranged in parallel in a width direction. Further, outside the length direction of the pressure generation chambers 62 of each row, there is formed a communication portion 63 which is communicated with a reservoir portion 81 provided in a reservoir forming substrate 80 which will be described later, and constitutes a reservoir 100 which serves as a common ink chamber to the pressure generation chambers 62. Further, the communication portion 63 is communicated with one end portion in the length direction of each pressure generation chamber 62 through an ink supply path 64. That is, in this embodiment, as a liquid flow path formed in the flow path forming substrate 60, the pressure generation chamber 62, the communication portion 63, and the ink supply path 64 are provided.

Further, a nozzle plate 70 formed with nozzle orifices 71 is fixed and attached on the opening face side of the flow path forming substrate 60 through an adhesive agent 400. Specifically, a plurality of nozzle plates 70 are provided to correspond to a plurality of head main bodies 220, and the nozzle plate 70 has an area slightly wider than an exposure opening portion 241 of the cover head 240 which will be described in detail later and is fixed at a region overlapped with the cover head 240 by an adhesive agent or the like. In addition, the nozzle orifice 71 of the nozzle plate 70 is perforated at a position which is communicated with the side opposite to the ink supply path 64 of each pressure generation chamber 62. In this embodiment, since the pressure generation chambers 62 arranged in parallel in the flow path forming substrate 60 are provided in two rows, nozzle rows 71A of the nozzle orifices 71 arranged in parallel in one head main body 220 are provided in two rows. Also, in this embodiment, the face, in which the nozzle orifices 71 are opened, of the nozzle plate 70 becomes a liquid ejecting face. As for the nozzle plate 70, for example, a silicon single crystal substrate, a metallic substrate such as stainless steel (SUS), or the like can be used.

On the other hand, on the opposite side to the opening face of the flow path forming substrate 60, piezoelectric elements 300 are formed on the elastic film 50, and each piezoelectric element is formed by stacking in sequence a lower electrode film made of metal, a piezoelectric body layer made of a piezoelectric material such as lead zirconate titanate (PZT), and an upper electrode film made of metal.

On the flow path forming substrate 60 on which the piezoelectric elements 300 are formed, the reservoir forming substrate 80 having the reservoir portion 81 constituting at least a portion of the reservoir 100 is joined. In this embodiment, the reservoir portion 81 is formed over the width direction of the pressure generation chamber 62 to pass through the reservoir forming substrate 80 in the thickness direction, and is communicated with the communication portion 63 of the flow path forming substrate 60, as described above, thereby constituting the reservoir 100 which serves as a common ink chamber to the pressure generation chambers 62.

Further, in a region of the reservoir forming substrate 80 facing the piezoelectric elements 300, piezoelectric element retention portions 82 are provided such that each has space which is of the extent that the movement of the piezoelectric element 300 is not obstructed.

Further, on the reservoir forming substrate 80, there are provided driving circuits 110 which are each composed of a semiconductor integrated circuit (IC) or the like for driving each piezoelectric element 300. Each terminal of the driving circuit 110 is connected to a lead-out wiring led out from the individual electrode of each piezoelectric element 300 through a bonding wiring (not shown) or the like. Also, each terminal of the driving circuit 110 is connected to the outside through an external wiring 111 such as a flexible printed circuit board (FPC) and receives various signals such as a print signal from the outside through the external wiring 111.

Further, a compliance substrate 140 is joined to the reservoir forming substrate 80. In regions of the compliance substrate 140 facing the reservoirs 100, ink inlet ports 144 for supplying ink to the reservoirs 100 are formed to pass through the reservoir forming substrate in the thickness direction. Further, a region other than the ink inlet ports 144 of the regions of the compliance substrate 140 facing the reservoirs 100 becomes a flexible portion 143 formed to be thin in the thickness direction, and the reservoirs 100 are sealed by the flexible portion 143. By the flexible portion 143, compliance is imparted to the insides of the reservoirs 100.

Further, the head case 230 is fixed to the compliance substrate 140.

The head case 230 is provide with ink supply communication paths 231, and each ink supply communication path 231 is communicated with the ink inlet port 144 and the main body side liquid flow path 36 of the flow path member 30 so as to supply the ink from the flow path member 30 to the ink inlet port 144. In the head case 230, in a region of the compliance substrate 140 facing the flexible portion 143, a recessed portion 232 is formed, so that the flexure deformation of the flexible portion 143 is appropriately performed. Further, in the head case 230, a driving circuit retention portion 233 passed through in the thickness direction is provided in a region facing the driving circuits 110 provided on the reservoir forming substrate 80, and the external wirings 111 pass through the driving circuit retention portion 233 and are connected to the driving circuits 110.

In each of the members constituting the head main body 220, pin insertion holes 234, into which pins for positioning each member at the time of assembly are inserted, are provided at two corner portions of the corner portions thereof. Then, by joining the members while performing the relative positioning of each member by inserting the pins into the pin insertion holes 234, the head main body 220 can be integrally assembled.

Also, the head main bodies 220 held in the flow path member 30 through the head cases 230 are relatively positioned and held by the cover head 240 having a box shape so as to cover the liquid ejecting face sides of five head main bodies 220, as shown in FIG. 2. The cover head 240 has the exposure opening portions 241 which expose the nozzle orifices 71, and a joining portion 242 which defines the exposure opening portions 241 and is joined to at least both end portion sides of the nozzle rows 71A, where the nozzle orifices 71 are arranged in parallel, of the liquid ejecting face of the head main body 220.

In this embodiment, the joining portion 242 is constituted by a frame portion 243 provided along the outer circumference of the liquid ejecting face over a plurality of head main bodies 220, and beam portions 244 which each extend between adjacent head main bodies 220 so as to divide the exposure opening portions 241. The frame portion 243 and the beam portions 244 are joined to the liquid ejecting faces of the head main bodies 220, that is, the surfaces of the nozzle plates 70.

Also, the cover head 240 is provided with a side wall portion 245 bent and extending over the outer circumferential edge portions of the liquid ejecting faces of the head main bodies 220 on the side face sides of the liquid ejecting faces.

In this manner, since the cover head 240 is made such that the joining portion 242 thereof is adhered to the liquid ejecting face of the head main body 220, it is possible to reduce a step between the liquid ejecting face and the cover head 240. Therefore, even if wiping, suction operation, or the like of the liquid ejecting face is performed, ink can be prevented from remaining on the liquid ejecting face. Also, since space between adjacent head main bodies 220 is blocked by the beam portion 244, ink does not intrude into a gap between adjacent head main bodies 220, so that the deterioration or the breaking of the piezoelectric element 300, the driving circuit 110, or the like due to ink can be prevented. Also, since the liquid ejecting face of the head main body 220 and the cover head 240 are adhered to each other by an adhesive agent without any gaps, the recording medium S is prevented from entering a gap, so that the deformation of the cover head 240 and paper jam can be prevented. Further, since the side wall portion 245 covers the outer circumferential edge portions of a plurality of head main bodies 220, ink can be reliably prevented from going around the side face of the head main body 220. Also, since the cover head 240 is provided with the joining portion 242 joined to the liquid ejecting face of the head main body 220, it is possible to position and join each nozzle row 71A of a plurality of head main bodies 220 with respect to the cover head 240 with high precision.

As for the cover head 240, for example, a metal material such as stainless steel can be used, and it may also be formed by the press working or the shape-forming of a metal plate. Also, by using an electrically-conductive metal material in the cover head 240, it is possible to ground the cover head 240. Also, the joining of the cover head 240 and the nozzle plate 70 is not particularly limited, but, for example, adhesion by a thermosetting epoxy-based adhesive agent or an ultraviolet cure type adhesive agent, or the like can also be utilized.

In such an ink jet type recording head 11 of this embodiment, after the ink from the ink cartridge 13 has been taken in from the main body side liquid flow path 36, so that the inside extending from the reservoir 100 to the nozzle orifice 71 has been filled with the ink through the ink supply communication path 231 and the ink inlet port 144, a voltage is applied to each piezoelectric element 300 corresponding to each pressure generation chamber 62 in accordance with the recording signal from the driving circuit 110, so that the deflective deformation of the elastic film 50 and the piezoelectric element 300 is generated, and consequently, the pressure in each pressure generation chamber 62 is increased, so that ink droplets are discharged out of the nozzle orifice 71.

Figure 7:
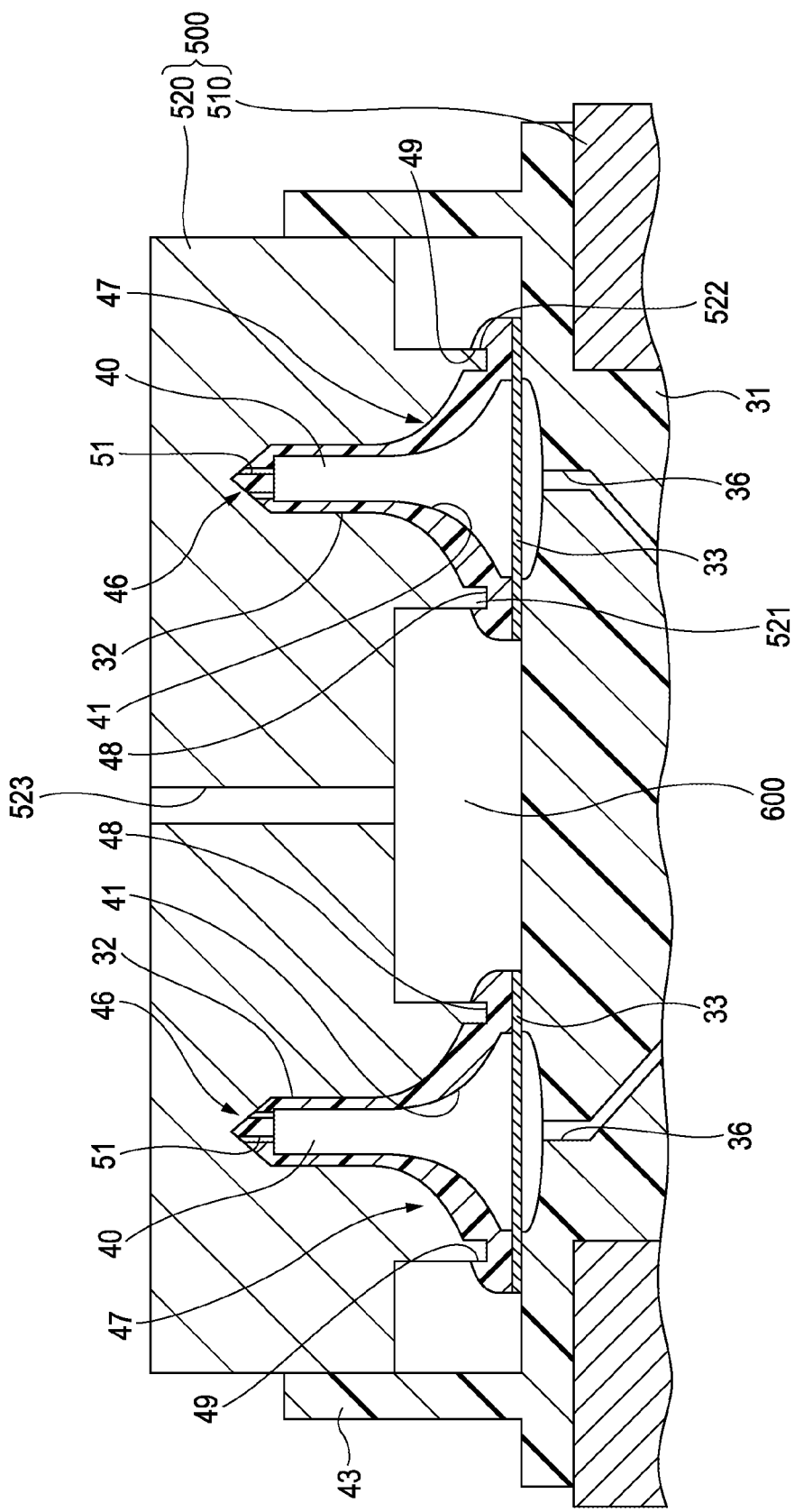
FIG. 7 is a cross-sectional view of the principal section, showing a manufacturing method of the recording head concerning Embodiment 1.
Figure 8:
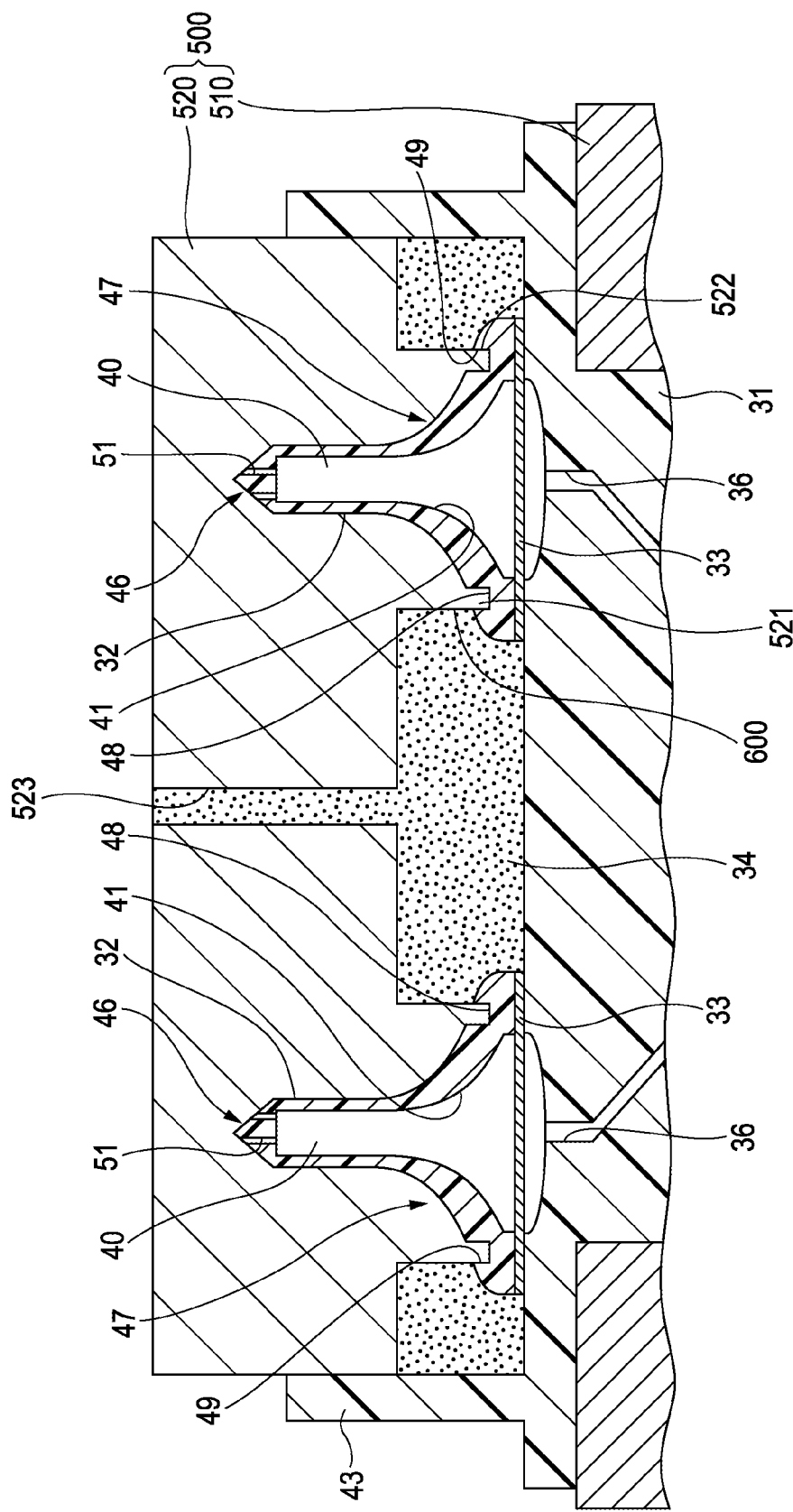
FIG. 8 is a cross-sectional view of the principal section, showing a manufacturing method of the recording head concerning Embodiment 1.
Figure 9:
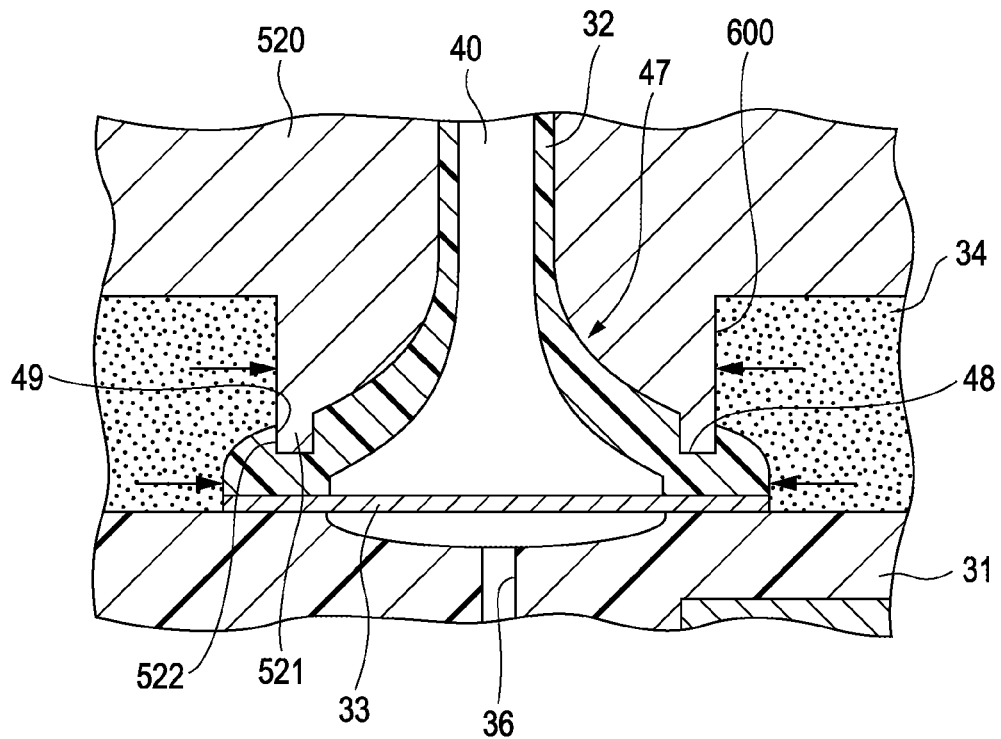
FIG. 9 is a cross-sectional view of the principal section, showing a manufacturing method of the recording head concerning Embodiment 1.

Here, a manufacturing method related to such an ink jet type recording head 11, particularly, the flow path member 30 will be explained in detail. FIGS. 7 and 8 are cross-sectional views of the principal section, explaining the manufacturing method of the ink jet type recording head concerning this embodiment, and FIG. 9 is an enlarged cross-sectional view of the principal section of FIG. 8.

First, as shown in FIG. 7, the flow path member main body 31 and the supply needle 32 are held in a frame section 500 such that the main body side liquid flow path 36 and the needle side liquid flow path 40 are communicated with each other (a holding process).

In this embodiment, since the filter 33 is provided between the flow path member main body 31 and the supply needle 32, the flow path member main body 31 and the supply needle 32 are held in the frame section 500 in a state where the filter 33 is sandwiched in between the flow path member main body 31 and the supply needle 32.

The frame section 500 which holds the flow path member main body 31 and the supply needle 32 includes a first frame portion 510, with which the flow path member main body 31 is engaged, and a second frame portion 520, with which the supply needle 32 is engaged, and the first and second frame portions 510 and 520 are provided to be divided upward and downward.

Further, in the inside of the frame section 500 in which the flow path member main body 31 and the supply needle 32 are held, a space portion 600 for forming the integrally-molded member 34 is provided. Here, the second frame portion 520 is provided with a projecting portion 521 which projects into the recessed portion 48 provided in the supply needle 32, and when the projecting portion 521 of the second frame portion 520 is inserted into the recessed portion 48, a side surface 522 on the space portion 600 side of the projecting portion 521 comes into contact with the contact surface 49 (inner surface) in the recessed portion 48.

Further, the first frame portion 510 and the second frame portion 520 are held such that the flow path member main body 31 and the supply needle 32 are pressed against each other with a given pressure. This is for suppressing the intrusion of molten resin, which is a material used when molding the integrally-molded member 34, into the liquid flow path in the subsequent process. At this time, in this embodiment, since the recessed portion 48 is provided in a region where the flow path member main body 31 and the supply needle 32 come into contact with each other (in this embodiment, in a region where the filter 33 is pinched), even if the supply needle 32 is relatively pressed against the flow path member main body 31 side through the recessed portion 48 by the projecting portion 521 of the second frame portion 520, the deformation of the supply needle 32 can be suppressed. On the other hand, if the recessed portion 48 is provided further inside than the region where the flow path member main body 31 and the supply needle 32 come into contact with each other, that is, at a region corresponding to the filter chamber 41, when the supply needle 32 is pressed through the recessed portion 48 by the projecting portion 521 of the second frame portion 520, there is a fear that the supply needle 32 will be deformed. Also, in a case where a region which floats without coming into contact with the flow path member main body 31 is present on the end portion side of the skirt portion 47 side of the supply needle 32, if the recessed portion 48 is formed at the floated region, there is a fear that the supply needle 32 will be deformed in the reverse direction. Therefore, it is preferable to provide the recessed portion 48 in the region where the flow path member main body 31 and the supply needle 32 come into contact with each other.

Next, as shown in FIG. 8, the flow path member 30 is formed by integrally molding the integrally-molded member 34. Specifically, by filling the space portion 600 with molten resin through a gate 523 of the frame portion, the integrally-molded member 34 is molded, and also the flow path member main body 31 and the supply needle 32 are joined (integral-molding-joined) and integrated by the integrally-molded member 34. At this time, as shown in FIG. 9, the side surface 522 on the space portion 600 side of the projecting portion 521 of the second frame portion 520 comes into contact with the contact surface 49 of the recessed portion 48 of the supply needle 32. Therefore, even if the supply needle 32 is pressed by the pressure at the time when the space portion 600 is filled with resin, the displacement (deformation) of the supply needle 32 is regulated by bringing the projecting portion 521 of the second frame portion 520 into contact with the contact surface 49 of the recessed portion 48, so that the deformation of the supply needle can be suppressed. Also, although the resin filled into the space portion 600 shrinks when being cooled and cured, the pressure at the time of the shrinkage is also regulated by bringing the projecting portion 521 of the second frame portion 520 into contact with the contact surface 49 of the recessed portion 48 of the supply needle 32, so that the deformation of the supply needle 32 is suppressed. That is, in this embodiment, by bringing the projecting portion 521 of the second frame portion 520 into contact with the contact surface 49 of the supply needle 32, it is possible to regulate the deformation of the supply needle 32 due to the pressure when the space portion 600 is filled with resin, shrinkage according to the cooling at the time when curing the resin, or the like. Further, by pressing the supply needle 32 against the flow path member main body 31 side through the recessed portion 48 by using the projecting portion 521 of the second frame portion 520, the intrusion of resin into the liquid flow path from a gap between the supply needle 32 and the flow path member main body 31 can be suppressed. Further, also by suppressing the deformation of the supply needle 32, gaps do not occur between the supply needle 32 and the flow path member main body 31, so that the intrusion of resin into the liquid flow path can be reliably reduced.

In this way, in the recording head 11 related to the invention, since the flow path member main body 31 and the supply needle 32 are fixed by the integrally-molded member 34, a region for welding the flow path member main body 31 and the supply needle 32 is not needed. Therefore, it is possible to shorten the distance between adjacent supply needles 32, and thus to reduce the size of the recording head 11. On the other hand, in a case where the filter is welded to the flow path member main body by heat welding or the like and the supply needle is further welded by ultrasonic welding or the like, since it is necessary that a region for welding the filter is provided on the flow path member main body and a region for welding the supply needle is further provided outside the above-mentioned region, the recording head becomes larger in size.

Also, in this embodiment, since a reduction in size is possible, it is not necessary to make the area of the filter smaller. That is, if the area of the filter is excessively small, dynamical pressure increases, so that a driving voltage which drives a pressure generation means such as a piezoelectric element or heater element must be increased. However, in the invention, since it is not necessary to reduce the size of the recording head by reducing the size of the filter, dynamical pressure does not increase, so that it is not necessary to raise the driving voltage.

Also, if the supply needle and the flow path member main body are fixed by welding, there is a fear that a gap will be generated, and ink will leak from the gap. However, in the invention, since the flow path member main body 31 and the supply needle 32 are fixed by the integrally-molded member 34, gaps are preventing from occurring between them, and thus ink is prevented from leaking from a gap. Also, even if a gap does occur, since the gap is covered by the integrally-molded member 34, the leakage of ink is prevented.

Further, since the integrally-molded member 34 is formed by molding, it is possible to use a material having low gas permeability (a material having high gas barrier property). In this manner, by using a material having low gas permeability for the integrally-molded member 34, it is possible to reduce the leakage of gas in ink in the liquid flow path to the outside, and also the intrusion of gas from the outside into the liquid flow path. On the other hand, in adhesion or welding, in general, a material having high gas permeability is high in adhesion force or welding force, whereas a material having low gas permeability is low in adhesion force or welding force. Therefore, it is difficult to satisfy both the guarantee of joint strength (adhesion force or welding force) and the guarantee of gas barrier property. However, by using the integrally-molded member 34, it is possible to satisfy both the guarantee of joint strength and the guarantee of gas barrier property.

Also, in this embodiment, since the flow path member main body 31 and the supply needle 32 are joined by integral-molding by using the integrally-molded member 34, it is possible to use a material having low gas permeability (having high gas barrier property) for the flow path member main body 31 and the supply needle 32. Therefore, it is possible to suppress the leakage of gas in ink in the liquid flow path to the outside, and also the intrusion of gas from the outside into the liquid flow path.

Thereafter, although it is not particularly shown in the drawings, by providing the head main body 220 on the flow path member 30 manufactured in this way through the head case 230, and then mounting the cover head 240 so as to cover the head main body 220, the recording head 11 is formed (refers to FIG. 2).

Other Embodiments

Figure 10:
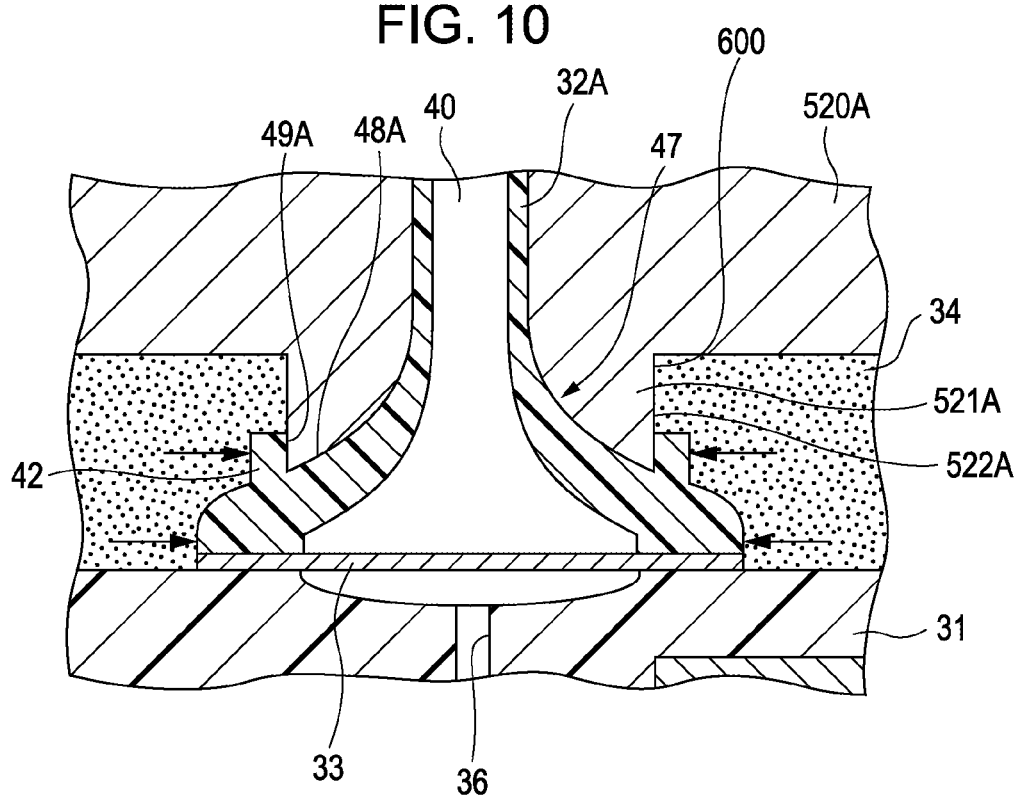
FIG. 10 is a cross-sectional view of the principal section showing a recording head concerning another embodiment.

Although Embodiment 1 of the invention was explained in the above, the basic configuration of the invention is not to be limited to the above description. For example, although in the above-described Embodiment 1, a configuration was made such that the recessed portion is provided in the supply needle 32, the invention is not particularly limited to this, but, for example, a configuration may also be made such that a protrusion portion is provided at the outer circumference of the supply needle. Such an example is shown in FIG. 10. Also, FIG. 10 is a cross-sectional view of the principal section, showing another embodiment of the ink jet type recording head concerning Embodiment 1 of the invention.

As shown in FIG. 10, a supply needle 32A is provided with a protrusion portion 42. In the outer circumference of the supply needle 32A, a substantive recessed portion 48A is formed further inside than the integrally-molded member 34 due to the protrusion portion 42. Also, the side surface of the protrusion portion 42 on the opposite side to the integrally-molded member 34 (the side surface on the integrally-molded member 34 side of the recessed portion 48A) becomes a contact surface 49A. Even in the supply needle 32A, similarly to the manufacturing method in Embodiment 1 described above, it is possible to mold the integrally-molded member 34 in a state where a side surface 522A of a projecting portion 521A of a second frame portion 520A is brought into contact with the contact surface 49A. Therefore, in a case where the protrusion portion 42 is provided, the contact surface 49A of the protrusion portion 42 on the opposite side to the integrally-molded member 34 is flush with the end surface of the integrally-molded member 34. In this configuration, an area which presses resin increases corresponding to the protrusion portion 42 thus provided. However, since the protrusion portion 42 can be regulated by the second frame portion 520A, the deformation of the supply needle 32A can be suppressed.

Also, in the examples shown in Embodiment 1 described above and FIG. 10, the recessed portion 48 (the protrusion portion 42) is provided such that the contact surface 49 or 49A becomes a surface perpendicular to the surface of the flow path main body 31, on which the supply needle 32 or 32A is provided. However, the invention is not particularly limited to these configurations. Here, a further example is shown in FIG. 11.

Figure 11:
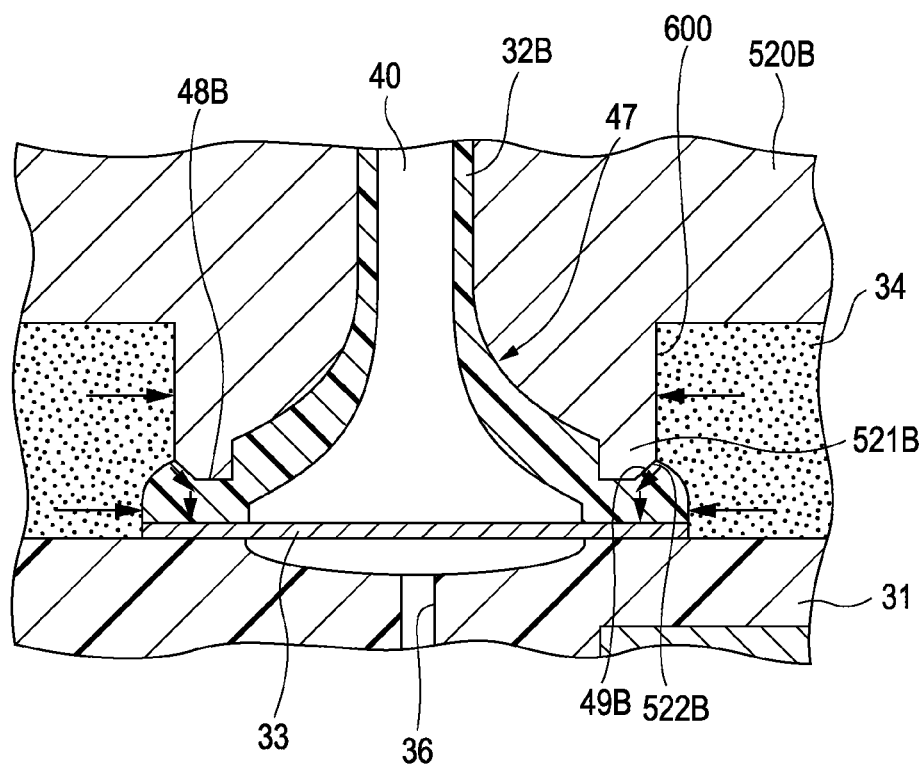
FIG. 11 is a cross-sectional view of the principal section showing a recording head concerning further another embodiment.

As shown in FIG. 11, the side surface on the integrally-molded member 34 side of a recessed portion 48B becomes a contact surface 49B provided to be inclined at an obtuse angle with respect to the surface of the flow path main body 31 on which the supply needle 32B is provided. If such an inclined contact surface 49B is provided, even if a second frame portion 520B is moved perpendicularly to a first frame portion (not shown), the inclined contact surface 49B does not interfere with the movement of the second frame portion 520B. Also, if the integrally-molded member 34 is molded in a state where a side surface 522B of a projecting portion 521B of the second frame portion 520B is brought into contact with the contact surface 49B of the recessed portion 48B, the pressure of the resin filling the space portion 600 is converted in a direction which presses the supply needle 32B to the flow path member main body 31 side due to the inclined contact surface 49B. Therefore, by bringing the second frame portion 520B into contact with the contact surface 49B, the deformation of the supply needle 32B can be suppressed, and also, the supply needle 32B is further pressed against the flow path member main body 31 side, so that the close contact of the supply needle 32B with the flow path member main body 31 is improved, whereby the occurrence of gaps between the supply needle 32B and the flow path member main body 31 is reduced, and thus the intrusion of resin into the liquid flow path is further suppressed.

Figure 12:
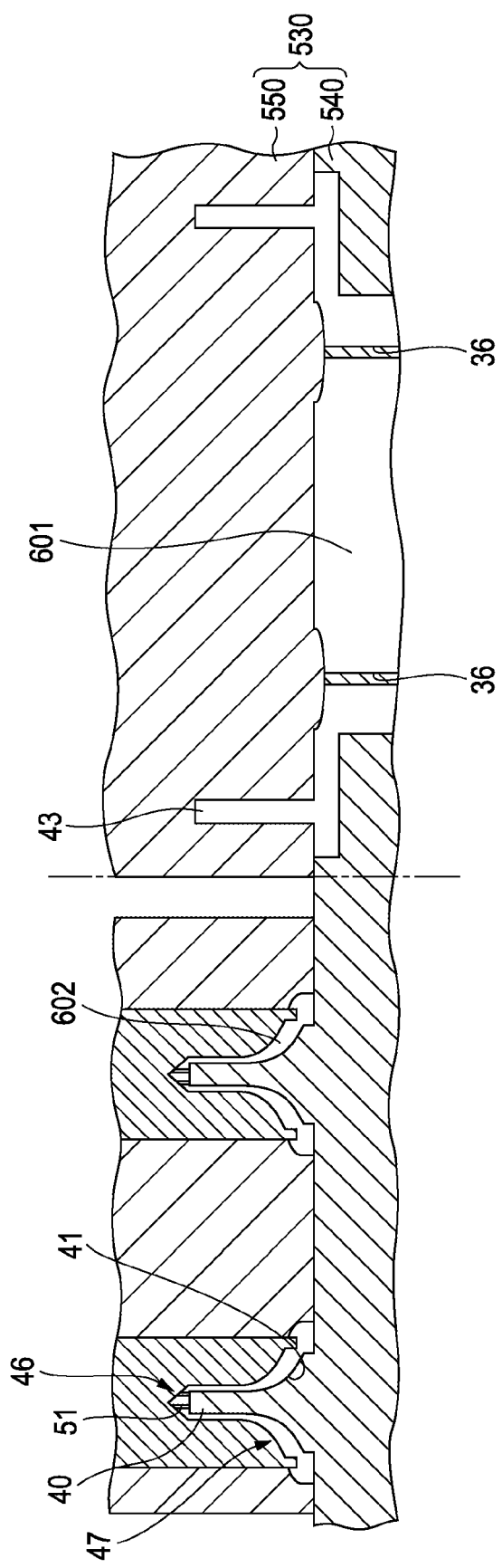
FIG. 12 is a cross-sectional view of the principal section showing a manufacturing method of the recording head concerning still further another embodiment.
Figure 13:
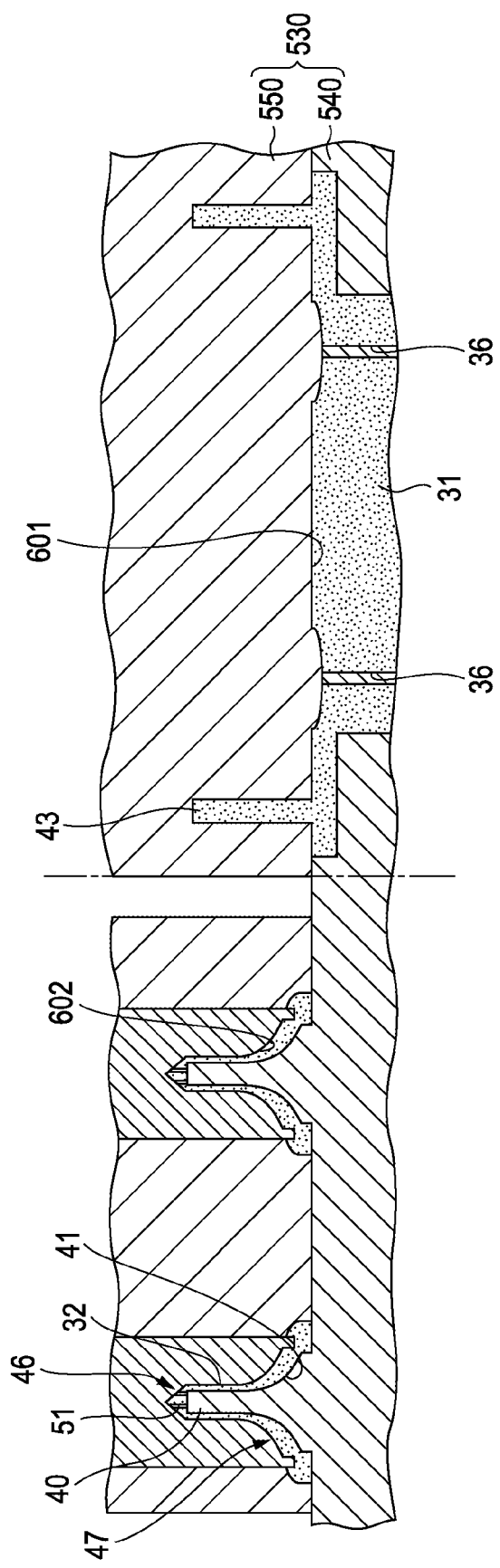
FIG. 13 is a cross-sectional view of the principal section showing a manufacturing method of the recording head concerning still further another embodiment.
Figure 14:
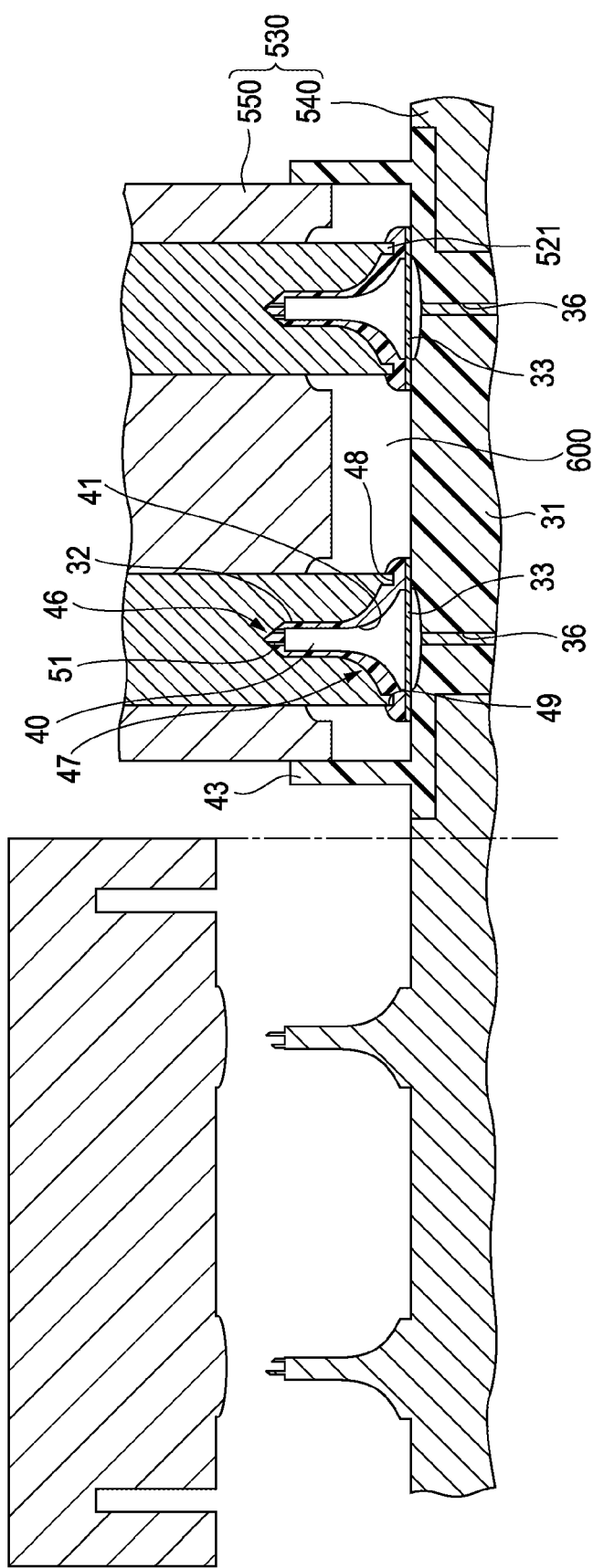
FIG. 14 is a cross-sectional view of the principal section showing a manufacturing method of the recording head concerning still further another embodiment.

Also, in Embodiment 1 described above, a configuration was made such that the flow path member main body 31 and the supply needle 32 are held in the frame section 500 which molding the integrally-molded member 34. However, the flow path member main body 31 and the supply needle 32 may also be molded. For example, after the flow path member main body 31 and the supply needle 32 have been simultaneously molded by a molding frame section, by core-backing a portion of the molding frame section, the integrally-molded member may also be molded using the molding frame section as a frame section having a space in the inside thereof. Such an example is explained with reference to FIGS. 12 to 14. FIGS. 12 to 14 are cross-sectional views showing a manufacturing method of the ink jet type recording head concerning still further another embodiment of the invention.

First, a molding frame section 530 is explained. The molding frame section 530 is constituted of a first molding frame portion 540 and a second molding frame portion 550, which can be divided upward and downward. In the molding frame section 530, there are provided a space portion 601 for a main body, which has the same shape as the flow path member main body 31, and in which the flow path member main body 31 is molded, and a space portion 602 for a needle, which has the same shape as the supply needle 32, and in which the supply needle 32 is molded.

The first molding frame portion 540 is provided to be rotatable in a plane where it comes into contact with the second molding frame portion 550, such that the space portion 601 for a main body and the space portion 602 for a needle switch positions with each other, as shown in FIG. 14.

Also, the first molding frame portion 540 is arranged such that a portion which defines the space portion 601 for a main body retreats (also referred to as "ascends") to the opposite side to the second molding frame portion 550 for a needle (core-backing).

When forming the flow path member 30 by using the molding frame section 530, first, as shown in FIG. 12, the space portion 601 for a main body and the space portion 602 for a needle are defined in the molding frame section 530 by bringing the first molding frame portion 540 and the second molding frame portion 550 into contact with each other. Then, as shown in FIG. 13, the flow path member main body 31 and the supply needle 32 are molded by filling the space portion 601 for a main body and the space portion 602 for a needle with molten resin through a gate (not shown) of the molding frame section 530.

Next, as shown in FIG. 14, the first molding frame portion 540 is rotated along with the supply needle 32. At this time, a portion of the region of the first molding frame portion 540, in which the supply needle 32 was formed, retreats (core-backs) to the opposite side to the flow path member main body 31, so that the space portion 600 in which the integrally-molded member 34 is molded is defined over the circumference of the supply needle 32 on one side face on the supply needle 32 side of the flow path member main body 31. That is, the molding frame section 530 becomes a frame section for molding the integrally-molded member 34 according to the retreat (core-back) of a portion thereof. Also, if the retreated region of the molding frame section 530 is positioned outside (on the opposite side to the leading end portion 46 of the supply needle 32) further than the projecting portion 521 which is inserted into the recessed portion 48 of the supply needle 32 and comes into contact with the contact surface 49, similarly to Embodiment 1 described above, the deformation of the supply needle 32 can be suppressed by the projecting portion 521.

In such a state, similarly to Embodiment 1 described above, by filling the space portion 600 with molten resin, the integrally-molded member 34 is molded, and also, the flow path member main body 31 and the supply needle 32 are joined and integrated by joining by using integral-molding.

Also, although in Embodiment 1 described above, the flow path member main body 31 was defined as the first flow path member, and the supply needle 32 was defined as the second flow path member, they may also be defined in the opposite way. Further, although the whole of the flow path member main body 31 which is connected to the head main body 220 was defined as the first flow path member, it is also acceptable that the flow path member main body 31 is divided into a member on the filter 33 side and a member on the head main body 220 side, and then, the member on the filter 33 side is defined as the first flow path member and integrated with the supply needle 32. Also, in this case, the flow path member 30 is constituted by assembling the flow path member main body on the head main body 220 side to the integrated member.

Also, although in Embodiment 1, a configuration was made such that the ink cartridge 13 which is the liquid reservoir means is detachably installed to the flow path member 30, the configuration of the invention is not particularly limited to this, but, for example, a configuration may also be arranged such that as the liquid reservoir means, an ink tank or the like is installed at a different position from the recording head 11, and the liquid reservoir means and the recording head 11 are connected to each other through a supply tube such as a tube. That is, although in Embodiment 1 described above, a needle-shaped supply needle 32 was illustrated as the second flow path member, the second flow path member is not to be limited to a needle-shaped member. Also, other than the supply needle 32, the flow path member main body 31 may also have a valve mechanism.

Also, although in Embodiment 1, a configuration was illustrated in which one head main body 220 is provided with respect to two main body side liquid flow paths 36, a plurality of head main bodies may also be provided for every ink color. In such a case, each main body side liquid flow path 36 is communicated with each head main body. That is, each main body side liquid flow path 36 may also be provided to be communicated with each nozzle row with the nozzle orifices arranged in parallel, which is provided in each head main body. Of course, the main body side liquid flow path 36 may also not be communicated with each nozzle row, or one main body side liquid flow path 36 may also be communicated with a plurality of nozzle rows. Also, one row of nozzle row is divided to two, and each nozzle row portion may also be communicated with the main body side liquid flow path 36. That is, it is acceptable if the main body side liquid flow path 36 is communicated with a nozzle orifice group composed of a plurality of nozzle orifices.

Also, although in the above-described embodiment, the invention was explained by illustrating the ink jet type recording head 11 which discharges ink droplets, the invention broadly targets liquid ejecting heads in general. As the liquid ejecting heads, a recording head used in an image recording apparatus such as a printer, a color material ejecting head used for the manufacturing of a color filter of a liquid crystal display or the like, an electrode material ejecting head used for the formation of the electrode of an organic EL display, a FED (Field Emission Display), or the like, a biological organic matter ejecting head used for the manufacturing of a bio-chip, and the like can be given as examples.

What is claimed is:

1. A manufacturing method of a liquid ejecting head including a flow path member that has first and second flow path members having liquid flow paths provided to be communicated with each other, and an integrally-molded member which is provided at a region surrounding the second flow path member on the second flow path member side of the first flow path member so as to join the first flow path member and the second flow path member together, the method comprising:
    a holding process of defining a space portion for forming the integrally-molded member in a frame section, and also bringing the frame section into contact with a contact surface of a recessed portion provided in the face of the second flow path member on the side opposite to the first flow path member, in a state where the first flow path member and the second flow path member are brought into contact with each other such that the liquid flow paths are communicated with each other; and a molding process of filling the space portion with resin, thereby molding the integrally-molded member, and also joining the first flow path member and the second flow path member together by the integrally-molded member.

2. The manufacturing method of a liquid ejecting head according to claim 1, wherein the first flow path member and the second flow path member are molded by a molding frame section, a portion of the molding frame section is used as the frame section in the molding process, and the space portion is defined by retreating a region surrounding the second flow path member of the molding frame section with respect to another region.

3. The manufacturing method of a liquid ejecting head according to claim 1, wherein the contact surface of the recessed portion of the second flow path member is flush with the end surface on the second flow path member side of the integrally-molded member.

4. The manufacturing method of a liquid ejecting head according to claim 1, wherein the contact surface of the second flow path member is provided to be inclined at an obtuse angle with respect to the face of the first flow path member on which the second flow path member is provided.

5. The manufacturing method of a liquid ejecting head according to claim 1, wherein the recessed portion is provided at a region where the first flow path member and the second flow path member come into contact with each other.

6. A manufacturing method of a liquid ejecting apparatus comprising:

electrically connecting a control section, which controls the liquid ejecting head manufactured by the manufacturing method of a liquid ejecting head according to claim 1, to the liquid ejecting head.

7. A liquid ejecting head comprising: a flow path member that has first and second flow path members having liquid flow paths provided to be communicated with each other, and an integrally-molded member which is provided a region surrounding the second flow path member on the second flow path member side of the first flow path member, and also joins the first flow path member and the second flow path member together, wherein in the second flow path member, further inside than the integrally-molded member, there is provided a recessed portion recessed in a direction which intersects with the surface of the first flow path member to which the second flow path member is joined.

8. A liquid ejecting apparatus provided with the liquid ejecting head according to claim 7.

* * * * *